(12) United States Patent
Ouderkirk et al.

(10) Patent No.: US 8,982,463 B2
(45) Date of Patent: Mar. 17, 2015

(54) TILTED PLATE NORMAL INCIDENCE COLOR COMBINER WITH A POLARIZING BEAM SPLITTER

(75) Inventors: Andrew J. Ouderkirk, Saint Paul, MN (US); Zhisheng Yun, Woodbury, MN (US); Xiaohui Cheng, Singapore (SG)

(73) Assignee: 3M Innovative Properties Company, St. Paul, MN (US)

( * ) Notice: Subject to any disclaimer, the term of this patent is extended or adjusted under 35 U.S.C. 154(b) by 175 days.

(21) Appl. No.: 13/822,735

(22) PCT Filed: Aug. 30, 2011

(86) PCT No.: PCT/US2011/049628
§ 371 (c)(1),
(2), (4) Date: Mar. 13, 2013

(87) PCT Pub. No.: WO2012/039895
PCT Pub. Date: Mar. 29, 2012

(65) Prior Publication Data
US 2013/0169894 A1    Jul. 4, 2013

Related U.S. Application Data

(60) Provisional application No. 61/385,248, filed on Sep. 22, 2010.

(51) Int. Cl.
*G02B 27/14* (2006.01)
*G02B 27/28* (2006.01)
(Continued)

(52) U.S. Cl.
CPC ........ *G02B 27/1006* (2013.01); *G02B 27/1033* (2013.01); *G02B 27/148* (2013.01); *G02B 27/283* (2013.01); *G03B 21/2033* (2013.01);
(Continued)

(58) Field of Classification Search
CPC .. G02B 27/14; G02B 27/141; G02B 27/1006; G02B 27/148; G02B 27/283; H04N 9/3105
USPC .............................. 359/487.01, 487.05, 629
See application file for complete search history.

(56) References Cited

U.S. PATENT DOCUMENTS 5,754,260 A    5/1998  Ooi
5,946,054 A *  8/1999  Sannohe et al. ............. 348/745
(Continued)

FOREIGN PATENT DOCUMENTS

JP    2002/040416    2/2002
WO    2007/016015    2/2007
(Continued)

OTHER PUBLICATIONS

Darmon, "LED-Illuminated Pico Projector Architectures", SID Symposium Digest of Technical Papers, May 2008, vol. 39, No. 1, pp. 1070-1073.
(Continued)

*Primary Examiner* — Nathanael R Briggs
(74) *Attorney, Agent, or Firm* — Yen T. Florczak (57) ABSTRACT

The disclosure generally relates to color combiners, and in particular color combiners useful in small size format projectors such as pocket projectors. The disclosed color combiners include at least two tilted dichroic plates having at least two reflectors configured with light collection optics to combine at least two colors of light.

20 Claims, 4 Drawing Sheets

(51) Int. Cl.
  *G02B 5/30* (2006.01)
  *G02B 27/10* (2006.01)
  *G03B 21/20* (2006.01)
  *G03B 33/12* (2006.01)
  *H04N 9/31* (2006.01)

(52) U.S. Cl.
  CPC .......... *G03B 21/2073* (2013.01); *G03B 21/208* (2013.01); *G03B 33/12* (2013.01); *H04N 9/3105* (2013.01); *H04N 9/3152* (2013.01); *H04N 9/3173* (2013.01)
  USPC .................. 359/485.01; 359/487.04; 359/629

(56) References Cited

U.S. PATENT DOCUMENTS

| | | | |
|---|---|---|---|
| 7,207,677 | B2 | 4/2007 | Takeda |
| 7,362,507 | B2 | 4/2008 | Duncan |
| 7,529,029 | B2 | 5/2009 | Duncan |
| 7,553,033 | B2 | 6/2009 | Seki |
| 2003/0218794 | A1 | 11/2003 | Takeda |
| 2005/0024699 | A1 | 2/2005 | Liu |
| 2005/0047135 | A1 | 3/2005 | Rhoads |
| 2006/0274288 | A1 | 12/2006 | Conner |
| 2007/0146638 | A1 | 6/2007 | Ma |
| 2008/0285129 | A1 | 11/2008 | Magarill |
| 2010/0033685 | A1 | 2/2010 | Seo |

FOREIGN PATENT DOCUMENTS

| | | |
|---|---|---|
| WO | 2009/085856 | 7/2009 |
| WO | 2009/086310 | 7/2009 |
| WO | 2009/139798 | 11/2009 |
| WO | 2009/139799 | 11/2009 |
| WO | 2010/059412 | 5/2010 |
| WO | 2010/059453 | 5/2010 |
| WO | 2010/059681 | 5/2010 |
| WO | 2010/059684 | 5/2010 |
| WO | 2011/146266 | 11/2011 |
| WO | 2011/146267 | 11/2011 |
| WO | 2011/146569 | 11/2011 |
| WO | 2012/039993 | 3/2012 |
| WO | 2012/039995 | 3/2012 |

OTHER PUBLICATIONS

International Search Report for International Application No. PCT/US2011/049628, mailed on Mar. 9, 2012, 3 pages.

\* cited by examiner

TILTED PLATE NORMAL INCIDENCE COLOR COMBINER WITH A POLARIZING BEAM SPLITTER

RELATED APPLICATIONS

This application is related to the following U.S. Patent Applications, which are incorporated by reference: "Tilted Dichroic Color Combiner I" 61/385,237 and "Tilted Dichroic Color Combiner II" 61/385,241, both filed on an even date herewith.

BACKGROUND

Projection systems used for projecting an image on a screen can use multiple color light sources, such as light emitting diodes (LED's), with different colors to generate the illumination light. Several optical elements are disposed between the LED's and the image display unit to combine and transfer the light from the LED's to the image display unit. The image display unit can use various methods to impose an image on the light. For example, the image display unit may use polarization, as with transmissive or reflective liquid crystal displays.

Still other projection systems used for projecting an image on a screen can use white light configured to imagewise reflect from a digital micro-mirror (DMM) array, such as the array used in Texas Instruments' Digital Light Processor (DLP®) displays. In the DLP® display, individual mirrors within the digital micro-mirror array represent individual pixels of the projected image. A display pixel is illuminated when the corresponding mirror is tilted so that incident light is directed into the projected optical path. A rotating color wheel placed within the optical path is timed to the reflection of light from the digital micro-mirror array, so that the reflected white light is filtered to project the color corresponding to the pixel. The digital micro-mirror array is then switched to the next desired pixel color, and the process is continued at such a rapid rate that the entire projected display appears to be continuously illuminated. The digital micro-mirror projection system requires fewer pixelated array components, which can result in a smaller size projector.

Image brightness is an important parameter of a projection system. The brightness of color light sources and the efficiencies of collecting, combining, homogenizing and delivering the light to the image display unit all affect brightness. As the size of modern projector systems decreases, there is a need to maintain an adequate level of output brightness while at the same time keeping heat produced by the color light sources at a low level that can be dissipated in a small projector system. There is a need for a light combining system that combines multiple color lights with increased efficiency to provide a light output with an adequate level of brightness without excessive power consumption by light sources.

Such electronic projectors often include a device for optically homogenizing a beam of light in order to improve brightness and color uniformity for light projected on a screen. Two common devices are an integrating tunnel and a fly's eye array (FEA) homogenizer. Fly's eye homogenizers can be very compact, and for this reason is a commonly used device. Integrating tunnels can be more efficient at homogenization, but a hollow tunnel generally requires a length that is often 5 times the height or width, whichever is greater. Solid tunnels often are longer than hollow tunnels, due to the effects of refraction.

Pico and pocket projectors have limited available space for efficient color combiners, light integrators, and/or homogenizers. As a result, efficient and uniform light output from the optical devices used in these projectors (such as color combiners and polarization converters) can require compact and efficient optical designs.

SUMMARY

The disclosure generally relates to color combiners, and in particular color combiners useful in small size format projectors such as pocket projectors. The disclosed color combiners include at least two tilted dichroic plates having at least two reflectors configured with light collection optics to combine at least two colors of light. In one aspect, the present disclosure provides a color combiner that includes a light collection optics having a light input surface and an optical axis, a first and a second light source disposed to inject a first and a second color light into the light input surface, and a first face of a polarizing beam splitter (PBS) facing the light collection optics and opposite the light input surface. At least one of the first and second light sources are displaced from the optical axis, and the PBS includes a reflective polarizer disposed at a polarizer angle to the optical axis. The color combiner further includes a first dichroic plate disposed facing a second face of the PBS opposite the light collection optics, the first dichroic plate disposed at a first tilt angle to the optical axis; a second dichroic plate disposed facing a third face of the PBS, the second dichroic plate disposed at a second tilt angle to the optical axis; and a first and a second retarder disposed between the PBS and the first and second dichroic plates, respectively. Each of the first and second dichroic plates include a first dichroic reflector capable of reflecting the first color light and transmitting other color light and a second reflector capable of reflecting the second color light, and further, the first dichroic reflector and the second reflector are each tilted such that the first and the second color light beam exit the PBS in an output direction as a collimated combined color light beam.

In another aspect, the present disclosure provides a color combiner that includes a light collection optics having a light input surface and an optical axis, a first and a second light source disposed to inject a first and a second color light into the light input surface, and a first face of a polarizing beam splitter (PBS) facing the light collection optics and opposite the light input surface. At least one of the first and second light sources are displaced from the optical axis, and the PBS includes a reflective polarizer disposed at a polarizer angle to the optical axis. The color combiner further includes a first dichroic plate disposed facing a second face of the PBS opposite the light collection optics, the first dichroic plate disposed at a first tilt angle to the optical axis; a second dichroic plate disposed facing a third face of the PBS, the second dichroic plate disposed at a second tilt angle to the optical axis; and a first and a second retarder disposed between the PBS and the first and second dichroic plates, respectively. Each of the first and second dichroic plates include a first dichroic reflector capable of reflecting the first color light and transmitting other color light and a second reflector capable of reflecting the second color light, and further, the first dichroic reflector and the second reflector are each tilted such that the first and the second color light beam exit the PBS in an output direction as a collimated combined color light beam. The color combiner still further includes a third light source disposed to inject a third color light into the light input surface and wherein the first and second dichroic plate each further comprises a third reflector capable of directing the third color light to exit in the output direction as the combined color light beam.

In yet another aspect, the present disclosure provides a color combiner that includes a light collection optics having a light input surface and an optical axis; a first, a second, and a third light source disposed to inject a first, a second, and a third color light into the light input surface, and a first face of a polarizing beam splitter (PBS) facing the light collection optics opposite the light input surface. At least two of the first, the second, and the third light sources are displaced from the optical axis, and the PBS includes a reflective polarizer disposed at a polarizer angle to the optical axis. The color combiner further includes a first dichroic plate disposed facing a second face of the PBS opposite the light collection optics, the first dichroic plate disposed at a first tilt angle to the optical axis; a second dichroic plate disposed facing a third face of the PBS, the second dichroic plate disposed at a second tilt angle to the optical axis; and a first and a second retarder disposed between the PBS and the first and second dichroic plates, respectively. Each of the first and second dichroic plates include a first dichroic reflector capable of reflecting the first color light and transmitting other color light, a second dichroic reflector capable of reflecting the second color light and transmitting other color light, and a third reflector. Further, the first dichroic reflector, the second dichroic reflector, and the third reflector are each tilted such that the first, the second, and the third color light beam exit the PBS in an output direction as a collimated combined color light beam.

In yet another aspect, the present disclosure provides an image projector that includes a color combiner; a polarization converter disposed to accept a first, a second, and a third color light and output a polarized first, second, and third color light; a spatial light modulator disposed to impart an image to the polarized first, second, and third color light; and projection optics. The color combiner includes a light collection optics having a light input surface and an optical axis, a first and a second light source disposed to inject a first and a second color light into the light input surface, and a first face of a polarizing beam splitter (PBS) facing the light collection optics and opposite the light input surface. At least one of the first and second light sources are displaced from the optical axis, and the PBS includes a reflective polarizer disposed at a polarizer angle to the optical axis. The color combiner further includes a first dichroic plate disposed facing a second face of the PBS opposite the light collection optics, the first dichroic plate disposed at a first tilt angle to the optical axis; a second dichroic plate disposed facing a third face of the PBS, the second dichroic plate disposed at a second tilt angle to the optical axis; and a first and a second retarder disposed between the PBS and the first and second dichroic plates, respectively. Each of the first and second dichroic plates include a first dichroic reflector capable of reflecting the first color light and transmitting other color light and a second reflector capable of reflecting the second color light, and further, the first dichroic reflector and the second reflector are each tilted such that the first and the second color light beam exit the PBS in an output direction as a collimated combined color light beam. The color combiner still further includes a third light source disposed to inject a third color light into the light input surface and wherein the first and second dichroic plate each further comprises a third reflector capable of directing the third color light to exit in the output direction as the combined color light beam.

In yet another aspect, the present disclosure provides an image projector that includes a color combiner; a polarization converter disposed to accept a first, a second, and a third color light and output a polarized first, second, and third color light; a spatial light modulator disposed to impart an image to the polarized first, second, and third color light; and projection optics. The color combiner includes a light collection optics having a light input surface and an optical axis; a first, a second, and a third light source disposed to inject a first, a second, and a third color light into the light input surface, and a first face of a polarizing beam splitter (PBS) facing the light collection optics opposite the light input surface. At least two of the first, the second, and the third light sources are displaced from the optical axis, and the PBS includes a reflective polarizer disposed at a polarizer angle to the optical axis. The color combiner further includes a first dichroic plate disposed facing a second face of the PBS opposite the light collection optics, the first dichroic plate disposed at a first tilt angle to the optical axis; a second dichroic plate disposed facing a third face of the PBS, the second dichroic plate disposed at a second tilt angle to the optical axis; and a first and a second retarder disposed between the PBS and the first and second dichroic plates, respectively. Each of the first and second dichroic plates include a first dichroic reflector capable of reflecting the first color light and transmitting other color light, a second dichroic reflector capable of reflecting the second color light and transmitting other color light, and a third reflector. Further, the first dichroic reflector, the second dichroic reflector, and the third reflector are each tilted such that the first, the second, and the third color light beam exit the PBS in an output direction as a collimated combined color light beam.

The above summary is not intended to describe each disclosed embodiment or every implementation of the present disclosure. The figures and the detailed description below more particularly exemplify illustrative embodiments.

BRIEF DESCRIPTION OF THE DRAWINGS

Throughout the specification reference is made to the appended drawings, where like reference numerals designate like elements, and wherein.

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

This disclosure generally relates to image projectors, in particular image projectors having an improved uniformity of light by combining the light using a tilted dichroic reflector plate. In one particular embodiment, the tilted dichroic reflector plate includes a plurality of dichroic filters laminated together, wherein each of the dichroic filters can be tilted at an angle to a normal to the dichroic reflector plate.

In one particular embodiment, a color combiner is described that includes at least two light emitting diodes (LEDs), each with a different color. The light emitted from the two LEDs is collimated into beams that substantially overlap, and the light from the two LEDs is combined and directed into a common area with the combined light beams having a lower etendue and higher brightness than the light emitted by the two LEDs.

In one aspect, the disclosure provides a compact method of efficiently combining the output from different color light sources. This can be particularly useful for producing illuminators for compact projection systems that are etendue limited. For example, a linear array of red, green, and blue LEDs, where the output of each LEDs is partially collimated by a set of primary optics, is incident on a tilted reflector plate assembly that contains dichroic reflector plates that reflect the red, green, and blue light at different angles. The reflected light is then output as a collimated combined color light beam.

In one particular embodiment, a color combiner is disclosed that reduces the combined etendue of two different colored light sources, where light emitted from the light sources are at least partially collimated into substantially overlapping beams of light. The beams of light are split into two polarized beams by a polarizing beam splitter, each polarized beam is converted to circularly polarized light with a ¼ wave retarder, each circularly polarized beam is incident on a dichroic plate having two reflectors. The circularly polarized beam is converted to linearly polarized light with the polarization state orthogonal to the or incident polarized beam, and the two reflectors are arranged such that the combined beams of light have a reduced etendue.

The LEDs may be used to illuminate projectors. Since LEDs emit light over an area with a near Lambertian angular distribution, the brightness of a projector is limited by the etendue of the source and the projection system. One method for reducing the etendue of the LED light source is to use dichroic reflectors to make two or more colors of LEDs spatially overlap, such that they appear to be emitting from the same region. Ordinarily, color combiners use the dichroic reflectors at an angle of about 45 degrees. This causes a strong reflective band shift, and limits the useful spectra and angular range of the dichroic reflector. In one particular embodiment, the present disclosure describes an article that combines different color LEDs using dichroic reflectors that are at near normal angles to the incident light beam.

The configuration of the 3 LEDs can be expanded to other colors, including yellow and infrared light, as understood by one of skill in the art. The light sources may include lasers combined with LEDs, and may be also be based on an all laser system. The LEDs may consist of a set emitting at least primary colors on short wavelength range of red, green, and blue, and a second set emitting the primary colors on the long wavelength range of red, green, and blue. Further, the aperture at which point the light is mixed may incorporate a Fly Eye Array (FEA) to provide further color integration. This may consist of a one or two dimensional array of lenses, with at least one dimension having 2 to about 20 lenses, as described elsewhere.

LCoS-based portable projection systems are becoming common due to the availability of low cost and high resolution LCoS panels. A list of elements in an LED-illuminated LCoS projector may include LED light source or sources, optional color combiner, optional pre-polarizing system, relay optics, PBS, LCoS panel, and projection lens unit. For LCoS-based projection systems, the efficiency and contrast of the projector is directly linked to the degree of polarization of light entering the PBS. For at least this reason, a pre-polarizing system that either utilizes a reflection/recycling optic or a polarization-conversion optical element, is often required.

Polarization conversion schemes utilizing polarizing beam splitters and half-wave retarders are one of the most efficient ways to provide polarized light into the PBS. One challenge with polarization-converted light is that it may suffer from spatial nonuniformity, leading to artifacts in the displayed image. Therefore, in systems with polarization converters, a homogenization system can be desirable, as described elsewhere.

In one particular embodiment, an illuminator for an image projector includes a light source in which emitted unpolarized light is directed into a polarization converter. The polarization converter separates the light into two paths, one for each polarization state. The path length for each of the two polarization states are approximately equal, and the polarized beams of light can then pass through to a monolithic FEA integrator. The monolithic FEA integrator can cause the light beams to diverge, and the light beams are then directed for further processing, for example, by using a spatial light modulator to impart an image to the light beams, and projection optics to display the image on a screen.

In some cases, optical projectors use a non-polarized light source, such as a light emitting diode (LED) or a discharge light, a polarization selecting element, a first polarization spatial modulator, and a second polarization selecting element. Since the first polarization selecting element rejects 50% of the light emitted from the non-polarized light source, polarization-selective projectors can often have a lower efficiency than non-polarized devices.

One technique of increasing the efficiency of polarization-selective projectors is to add a polarization converter between the light source and the first polarization selecting element. Generally, there are two ways of designing a polarization converter used in the art. The first is to partially collimate the light emitting from the light source, pass the partially collimated beam of light through an array of lenses, and position an array of polarization converters at each focal point. The polarization converter typically has a polarizing beam splitter having polarization selective tilted film (for example MacNeille polarizer, a wire grid polarizer, or birefringent optical film polarizer), where the reflected polarization is reflected by a tilted reflector such that the reflected beam propagates parallel to the beam that is transmitted by the tilted polarization selective film. Either one or the other beams of polarized light is passed through half-wave retarders, such that both beams have the same polarization state.

Another technique of converting the unpolarized light beam to a light beam having a single polarization state is to pass the entire beam of light through a tilted polarization selector, and the split beams are conditioned by reflectors and half-wave retarders such that a single polarization state is emitted. Illuminating a polarization selective spatial light modulator directly with a polarization converter can result in illuminance and color non-uniformity.

In one particular embodiment, a polarization converter can incorporate a fly's eye array (FEA) to homogenize the light in a projection system. The output side of the polarization converter includes a monolithic FEA to homogenize the light. The input and output side of the monolithic FEA include the same number of lenses, with each lens on the output side centered approximately at the focal point of a matching lens at the input side. The lenses can be cylindrical, bi-convex, spherical, or aspherical; however, in many cases spherical lenses can be preferred. The fly's eye integrator and polarization converter can significantly improve the illuminance and color uniformity of the projector, as described elsewhere.

Generally, a tilted dichroic plate can be applied to PBS-based color combiners, with tilted dichroic plates being substituted for dichroic reflectors as known by one of skill in the art. In this manner, light collimation optics can provide a technique for inputting several colors of light to be combined, and the tilted dichroic plate can compensate for lights that are input a positions removed from the optical axis of the light collimation optics. Suitable PBS-based color combiners for use in the present disclosure include those described, for example, in PCT Patent Publication Nos. WO2009/085856 entitled "Light Combiner", WO2009/086310 entitled "Light Combiner", WO2009/139798 entitled "Optical Element and Color Combiner", WO2009/139799 entitled "Optical Element and Color Combiner"; and also in co-pending PCT Patent Application Nos. US2009/062939 entitled "Polarization Converting Color Combiner", US2009/063779 entitled "High Durability Color Combiner", US2009/064927 entitled "Color Combiner", and US2009/064931 entitled "Polarization Converting Color Combiner", incorporated herein in their entirety.

Figure 1A:
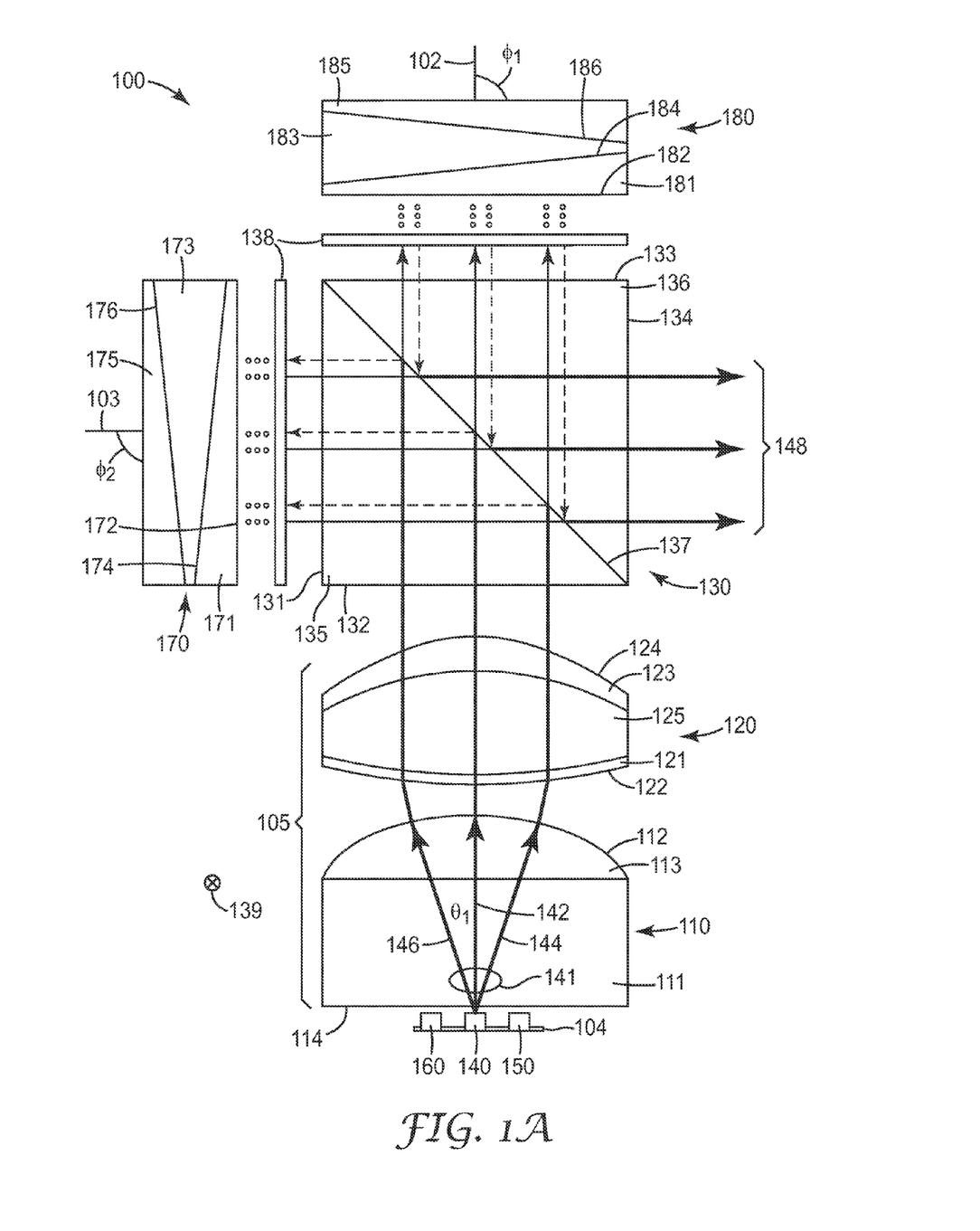
FIG. 1A shows a cross-section schematic of a color combiner.
Figure 1B:
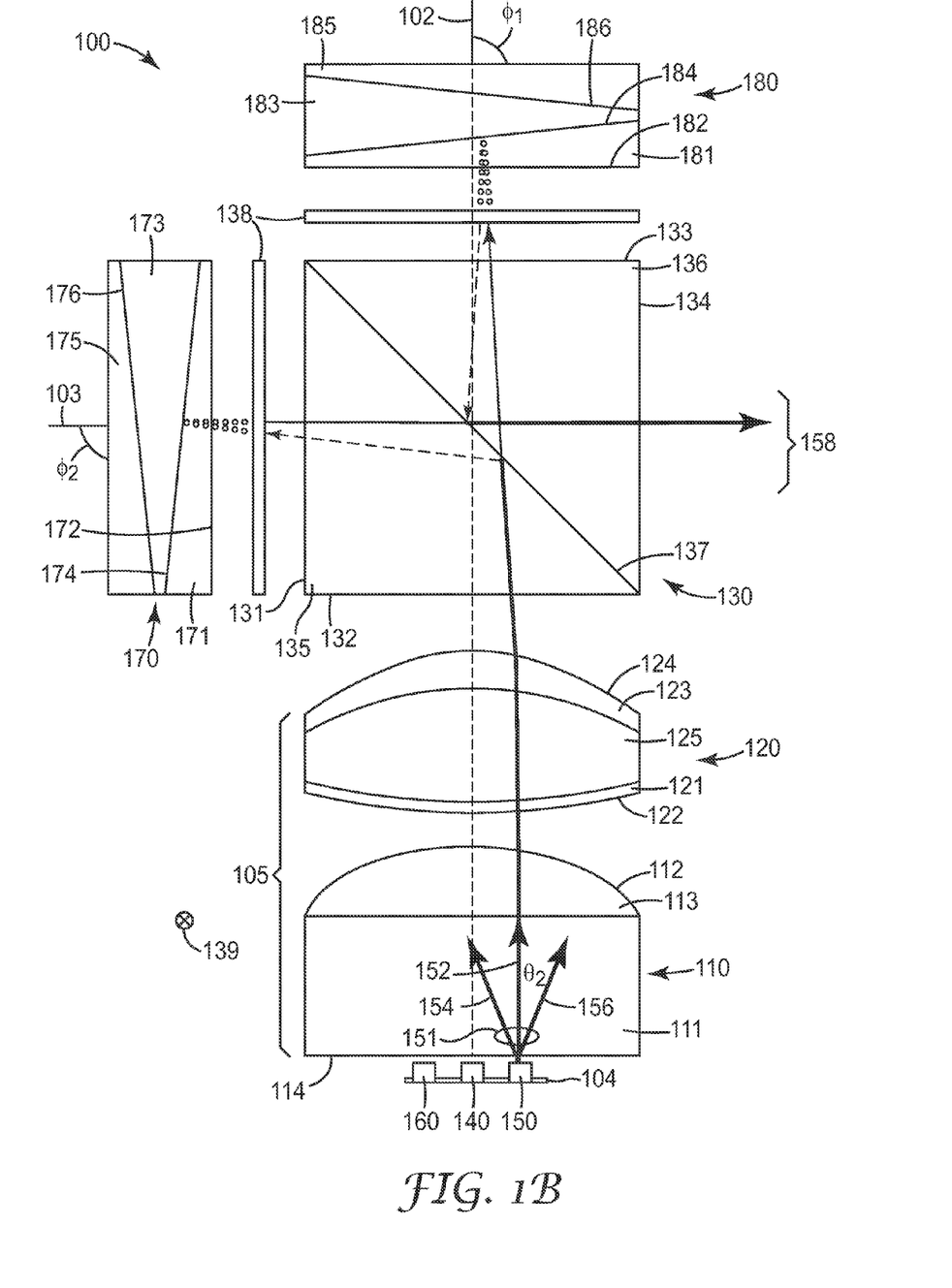
FIG. 1B shows a cross-section schematic of a color combiner.
Figure 1C:
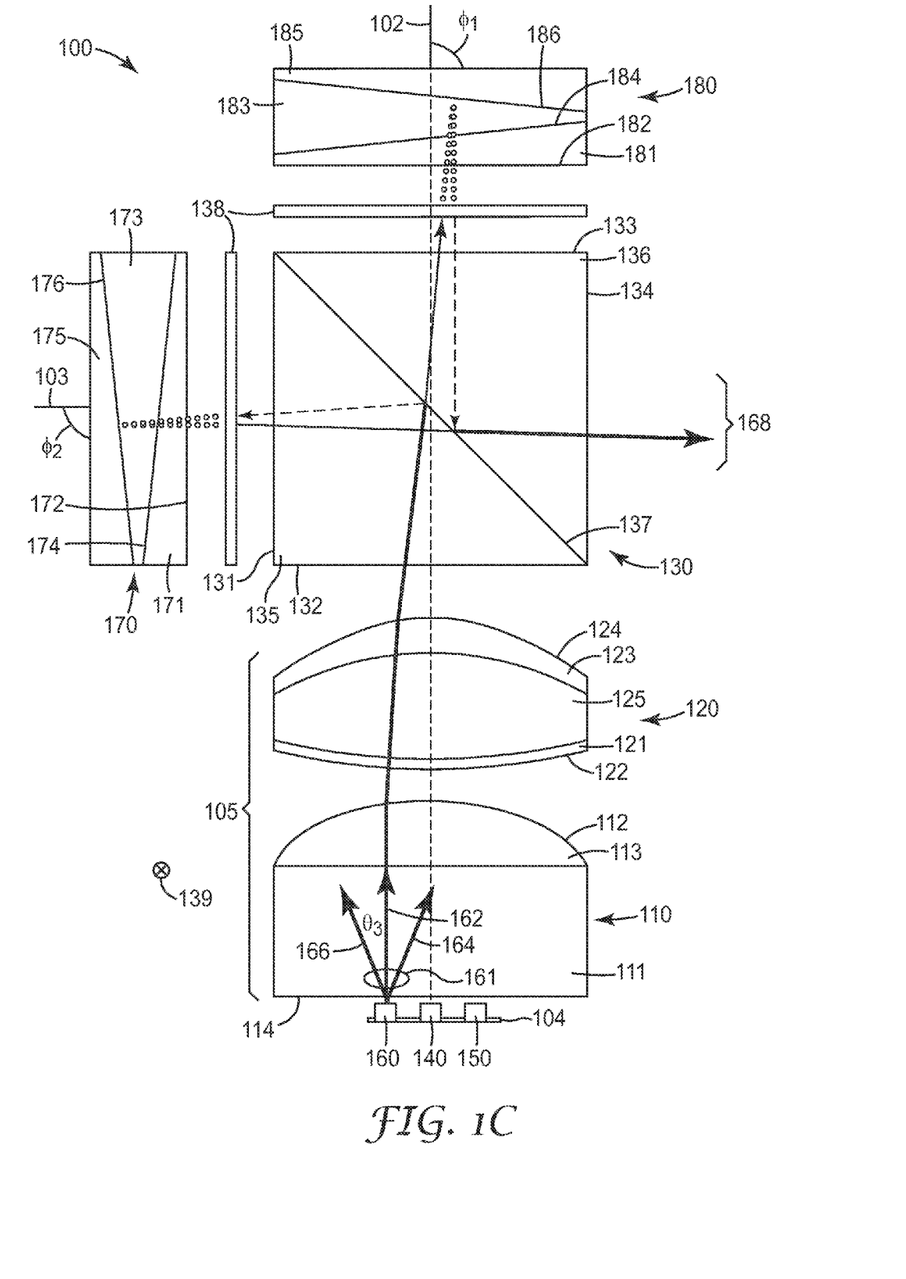
FIG. 1C shows a cross-section schematic of a color combiner.

FIG. 1A-1C shows a cross-section schematic of a color combiner 100 according to one aspect of the disclosure. Color combiner 100 includes a light collection optics 105 including a first lens element 110 and a second lens element 120. The light collection optics 105 includes a light input surface 114 and an optical axis 102 perpendicular to the light input surface 114. A first light source 140, a second light source 150, and an optional third light source 160 are each disposed on a light injection surface 104 that faces the light input surface 114. Each of the first, the second, and the optional third light sources 140, 150, 160, are disposed to inject a first color light 141, a second color light 151, and a third color light 161, respectively, into the light input surface 114, as described elsewhere.

In one particular embodiment, light collection optics 105 can be a light collimator that serves to collimate the light emitted from the first, second, and optional third light sources 140, 150, 160. Light collection optics 105 can include a one lens light collimator (not shown), a two lens light collimator (shown), a diffractive optical element (not shown), or a combination thereof. The two lens light collimator has first lens element 110 that includes a first convex surface 112 disposed opposite the light input surface 114. Second lens element 120 includes a second surface 122 facing the first convex surface 112, and a third convex surface 124 opposite the second surface 122. Second surface 122 can be selected from a convex surface, a planar surface, and a concave surface.

Color combiner 100 further includes a polarizing beam splitter (PBS) 130 that has a first prism 135, a second prism 136, and a reflective polarizer 137 disposed on a diagonal face between them. The first prism 135 includes a first prism face 131 and a second prism face 132, and the second prism 136 includes a third prism face 133 opposite the second prism face 132 and a fourth prism face 134 opposite the first prism face 131.

The PBS includes an input surface shown in FIGS. 1A-1C as second prism face 132, an output surface shown in FIGS. 1A-1C as fourth prism face 134, and a reflective polarizer 137. In one embodiment, the reflective polarizer 137 can be aligned to a first polarization direction 139. The reflective polarizer 137 is positioned so that light from the first, the second, and the optional third light source 140, 150, 160, input to the PBS 130 intercepts the reflective polarizer 137 at approximately a 45 degree angle. In one embodiment, the intercept angle ranges from 35 to 55 degrees; from 40 to 50 degrees; from 43 to 48 degrees; or from 44.5 to 45.5 degrees.

The reflective polarizer 137 can be any known reflective polarizer such as a MacNeille polarizer, a wire grid polarizer, or a multilayer optical film polarizer. According to one embodiment, a multilayer optical film polarizer can be a preferred first reflective polarizer. The first reflective polarizer can be disposed between the diagonal faces of two prisms, or it can be a free-standing film such as a pellicle. In some embodiments, the PBS light utilization efficiency is improved when the first reflective polarizer is disposed between two prisms. In this embodiment, some of the light traveling through the PBS which would otherwise be lost from the optical path can undergo Total Internal Reflection (TIR) from the prism faces and rejoin the optical path. For at least this reason, the following description is directed to PBSs where first reflective polarizers are disposed between the diagonal faces of two prisms; however, it is to be understood that the PBS can function in the same manner when used as a pellicle. In one aspect, all of the external faces of the PBS prisms are highly polished so that light entering the PBS undergoes TIR. In this manner, light is contained within the PBS and the light is partially homogenized while still preserving etendue.

In one particular embodiment, color combiner 100 further includes a second dichroic plate 180 disposed facing the third prism face 133 along the optical axis 102, such that the PBS 130, the first lens element 110, and the second lens element 120 are between the second dichroic plate 180 and the light input surface 114. The second dichroic plate 180 can be disposed at a second dichroic plate tilt angle φ1 to the optical axis 102, and includes a first dichroic reflector 182 capable of reflecting the first color light 141 and transmitting all other colors of light. The second dichroic plate 180 further includes a second dichroic reflector 184 capable of reflecting the second color light 151 and transmitting all other colors of light. The second dichroic plate 180 still further includes an optional third dichroic reflector 186 that is capable of reflecting the third color light 161. In some cases, for example when only a first and a second light source 140, 150 are included (that is, optional third light source 160 is omitted), second dichroic reflector 184 can be instead a generic reflector such as a broadband mirror, since there is no need to transmit other wavelengths (that is, colors) of light. In some cases, for example when optional third light source 160 is included, optional third dichroic reflector 186 can also be a reflector such as a broadband mirror, since all other colors of light are already reflected by the other dichroic reflectors, prior to reaching the third dichroic reflector 186.

The second dichroic plate 180 is fabricated such that each of the first, second, and optional third dichroic reflectors 182, 184, 186, are tilted at a dichroic tilt angle to the optical axis 102. Each of the dichroic tilt angles can be selected to direct the reflected beams from each of the first, second, and optional third light sources 140, 150, 160, back into the PBS 130, as described elsewhere. A description of dichroic tilt angles can also be found, for example, in co-pending U.S. Patent Applications entitled "Tilted Dichroic Color Combiner I" Ser. No. 61/385,237 and "Tilted Dichroic Color Combiner II" Ser. No. 61/385,241, filed on an even date herewith.

In one particular embodiment, color combiner 100 includes a first dichroic plate 170 disposed facing the first prism face 131 along an optical axis normal 103 to the optical axis 102 such that the first dichroic plate 170 is on a prism face adjacent to second dichroic plate 180. The first dichroic plate 170 can be disposed at a first dichroic plate tilt angle φ2 to the optical axis normal 103, and includes a first dichroic reflector 172 capable of reflecting the first color light 141 and transmitting all other colors of light. The first dichroic plate 170 further includes a second dichroic reflector 174 capable of reflecting the second color light 151 and transmitting all other colors of light. The first dichroic plate 170 still further includes an optional third dichroic reflector 176 that is capable of reflecting the third color light 161. In some cases, for example when only a first and a second light source 140, 150 are included (that is, optional third light source 160 is omitted), second dichroic reflector 174 can be instead a generic reflector such as a broadband mirror, since there is no need to transmit other wavelengths (that is, colors) of light. In some cases, for example when optional third light source 160 is included, optional third dichroic reflector 176 can also be a reflector such as a broadband mirror, since all other colors of light are already reflected by the other dichroic reflectors, prior to reaching the third dichroic reflector 186.

The first dichroic plate 170 is fabricated such that each of the first, second, and third dichroic reflectors 172, 174, 176, are tilted at a dichroic tilt angle to the optical axis normal 103. Each of the dichroic tilt angles can be selected to direct the reflected beams from each of the first, second, and optional third light sources 140, 150, 160, back into the PBS 130, as described elsewhere. A description of dichroic tilt angles can also be found, for example, in co-pending U.S. Patent Applications entitled "Tilted Dichroic Color Combiner I" Ser. No. 61/385,237 and "Tilted Dichroic Color Combiner II" Ser. No. 61/385,241, filed on an even date herewith.

A retarder 138 is positioned between each of the first and the second tilted dichroic plates 170, 180 and the respective first and third prism faces 131, 133. The retarder 138 participates with each of the dichroic reflectors (172, 174, 176, 182, 184, 186) to change the polarization state of light reflecting back into the PBS 130, as described elsewhere. The retarder can provide any desired retardation, such as an eighth-wave retarder, a quarter-wave retarder, and the like. In embodiments described herein, there is an advantage to using a quarter-wave retarder and the associated reflective polarizer. Linearly polarized light is changed to circularly polarized light as it passes through a quarter-wave retarder aligned at an angle of 45° to the axis of light polarization. Subsequent reflections from the reflective polarizers and quarter-wave retarders in the color combiner result in efficient combined light output from the light combiner. In contrast, linearly polarized light is changed to a polarization state partway between s-polarization and p-polarization (either elliptical or linear) as it passes through other retarders and orientations, and can result in a lower efficiency of the combiner.

According to one embodiment described below, a color light combining system receives unpolarized light from different color unpolarized light sources, and produces a combined light output that is also unpolarized. In one aspect, up to three received color lights are each split according to polarization (for example, s-polarization and p-polarization) by the reflective polarizer. According to one particular embodiment, the retarder is a quarter-wave retarder having a slow-axis aligned at 45 degrees to the first polarization direction 139.

The path of first, second, and third color light 141, 151, 161, can be traced through the color combiner 100, with reference to FIGS. 1A-1C. FIG. 1A shows the first light source 140, disposed along the optical axis 102, injecting first color light 141 into the light input surface 114. First color light 141 includes a central first color light ray 142 and two boundary first color light rays 144, 146, that represent the light within a first input collimation angle θ1. Each of the first color light rays 142, 144, 146, pass through light collection optics 105 and enter second prism face 132 of PBS 130 as an at least partially collimated first color light beam. Each of the first color light rays 142, 144, 146 then intercept reflective polarizer 137 and are split into p-polarized first color light rays (solid lines) and s-polarized first color light rays (dashed lines).

S-polarized first color light rays (reflected from reflective polarizer 137) exit PBS 130 through first prism face 131, pass through quarter-wave retarder 138 becoming circular polarized first color light rays (circular lines) which reflect from first dichroic reflector 172 of first dichroic plate 170, changing the direction of circular polarization. Circular polarized first color light rays then pass again through quarter-wave retarder 138 becoming p-polarized first color light rays, re-enter PBS 130 through first prism face 131, pass through reflective polarizer 137, and exit PBS 130 through fourth prism face 134 as the p-polarized portion of unpolarized collimated first output light 148.

P-polarized first color light rays (transmitted through reflective polarizer 137) exit PBS 130 through third prism face 133, pass through quarter-wave retarder 138 becoming circular polarized first color light rays (circular lines) which reflect from first dichroic reflector 182 of second dichroic plate 180, changing the direction of circular polarization. Circular polarized first color light rays then pass again through quarter-wave retarder 138 becoming s-polarized first color light rays, re-enter PBS 130 through third prism face 133, reflect from reflective polarizer 137, and exit PBS 130 through fourth prism face 134 as the s-polarized portion of unpolarized collimated first output light 148.

FIG. 1B shows the second light source 150, disposed adjacent the optical axis 102, injecting second color light 151 into the light input surface 114. Second color light 151 includes a central second color light ray 152 and two boundary second color light rays 154, 156, that represent the light within a second input collimation angle θ2. Each of the second color light rays 152, 154, 156, pass through light collection optics 105 and enter second prism face 132 of PBS 130 as an at least partially collimated second color light beam. Each of the second color light rays 152, 154, 156 then intercept reflective polarizer 137 and are split into p-polarized second color light rays (solid lines) and s-polarized second color light rays (dashed lines). For clarity, only the central second color light ray 152 is traced through the color combiner 100 shown in FIG. 1C, although it is to be understood that each of the second color light rays 152, 154, 156, follow similar paths.

S-polarized second color light rays (reflected from reflective polarizer 137) exit PBS 130 through first prism face 131, pass through quarter-wave retarder 138 becoming circular polarized second color light rays (circular lines) which pass through first dichroic reflector 172, and then reflect from second dichroic reflector 174 of first dichroic plate 170, changing the direction of circular polarization. Circular polarized second color light rays pass again through first dichroic reflector 172 and quarter-wave retarder 138, becoming p-polarized second color light rays. P-polarized second color light rays re-enter PBS 130 through first prism face 131, pass through reflective polarizer 137, and exit PBS 130 through fourth prism face 134 as the p-polarized portion of unpolarized collimated second output light 158.

P-polarized second color light rays (transmitted through reflective polarizer 137) exit PBS 130 through third prism face 133, pass through quarter-wave retarder 138 becoming circular polarized second color light rays (circular lines) which pass through first dichroic reflector 182 and reflect from second dichroic reflector 184 of second dichroic plate 180, changing the direction of circular polarization. Circular polarized second color light rays then pass again through first dichroic reflector 182 and quarter-wave retarder 138 becoming s-polarized second color light rays. S-polarized second color light rays re-enter PBS 130 through third prism face 133, reflect from reflective polarizer 137, and exit PBS 130 through fourth prism face 134 as the s-polarized portion of unpolarized collimated second output light 158.

FIG. 1C shows the optional third light source 160, disposed adjacent the optical axis 102, injecting third color light 161 into the light input surface 114. Third color light 161 includes a central third color light ray 162 and two boundary third color light rays 164, 166, that represent the light within a third input collimation angle θ3. Each of the third color light rays 162, 164, 166, pass through light collection optics 105 and enter second prism face 132 of PBS 130 as an at least partially collimated third color light beam. Each of the third color light rays 162, 164, 166 then intercept reflective polarizer 137 and are split into p-polarized third color light rays (solid lines) and s-polarized third color light rays (dashed lines). For clarity, only the central third color light ray 162 is traced through the color combiner 100 shown in FIG. 1C, although it is to be understood that each of the third color light rays 162, 164, 166, follow similar paths.

S-polarized third color light rays (reflected from reflective polarizer 137) exit PBS 130 through first prism face 131, pass through quarter-wave retarder 138 becoming circular polarized third color light rays (circular lines) which pass through first dichroic reflector 172, pass through second dichroic reflector 174 and then reflect from third dichroic reflector 176 of first dichroic plate 170, changing the direction of circular polarization. Circular polarized third color light rays then pass again through second dichroic reflector 174, first dichroic reflector 172, and quarter-wave retarder 138, becoming p-polarized third color light rays. P-polarized third color light rays re-enter PBS 130 through first prism face 131, pass through reflective polarizer 137, and exit PBS 130 through fourth prism face 134 as the p-polarized portion of unpolarized collimated third output light 168.

P-polarized third color light rays (transmitted through reflective polarizer 137) exit PBS 130 through third prism face 133, pass through quarter-wave retarder 138 becoming circular polarized third color light rays (circular lines) which pass through first dichroic reflector 182, second dichroic reflector 184, and reflect from third dichroic reflector 186 of second dichroic plate 180, changing the direction of circular polarization. Circular polarized third color light rays then pass again through second dichroic reflector 184, first dichroic reflector 182 and quarter-wave retarder 138, becoming s-polarized third color light rays. S-polarized third color light rays re-enter PBS 130 through third prism face 133, reflect from reflective polarizer 137, and exit PBS 130 through fourth prism face 134 as the s-polarized portion of unpolarized collimated third output light 168.

In one particular embodiment, at least one of the first input collimation angle θ1, the second input collimation angle θ2, and the third input collimation angle θ3 can be the same, and injection optics (not shown) associated with each of the first, the second, and the optional third light sources 140, 150, 160, can restrict these input collimation angles to angles between about 10 degrees and about 80 degrees, or between about 10 degrees to about 70 degrees, or between about 10 degrees to about 60 degrees, or between about 10 degrees to about 50 degrees, or between about 10 degrees to about 40 degrees, or between about 10 degrees to about 30 degrees or less. In some cases, the light collection optics 105 and the first and second dichroic plates 170, 180, can be fabricated such that each of the first output light 148, the second output light 158, and the third output light 168 can also include the same output collimation angle (not shown). In one particular embodiment, each of the input collimation angles ranges from about 60 to about 70 degrees, and each of the output collimation angles can range from less than about 20 degrees, or less than about 15 degrees, or even less than about 12 degrees; that is, the output light can be well collimated.

Figure 2:
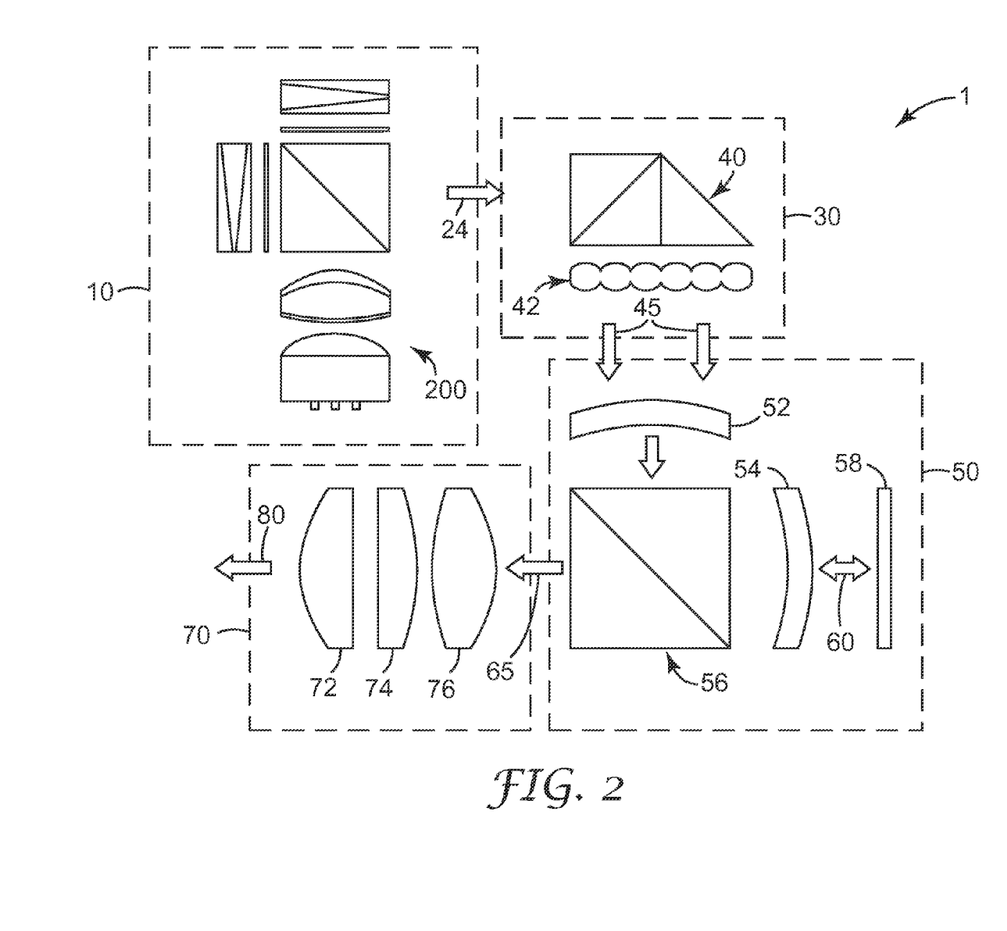
FIG. 2 shows a schematic diagram of an image projector.

FIG. 2 shows a schematic diagram of an image projector 1, according to one aspect of the disclosure. Image projector 1 includes a color combiner module 10 that is capable of injecting a partially collimated combined color light output 24 into a homogenizing polarization converter module 30 where the partially collimated combined color light output 24 becomes converted to a homogenized polarized light 45 that exits the homogenizing polarization converter module 30 and enters an image generator module 50. The image generator module 50 outputs an imaged light 65 that enters a projection module 70 where the imaged light 65 becomes a projected imaged light 80.

In one aspect, color combiner module 10 includes different wavelength spectrum input light sources that are input through color combiner 200, as described elsewhere. The color combiner 200 produces a partially collimated combined color light output 24 that includes the different wavelength spectrum lights, as described elsewhere.

In one aspect, the input light sources are unpolarized, and the partially collimated combined color light output 24 is also unpolarized. The partially collimated combined color light output 24 can be a polychromatic combined light that comprises more than one wavelength spectrum of light. The partially collimated combined color light output 24 can be a time sequenced output of each of the received lights. In one aspect, each of the different wavelength spectra of light corresponds to a different color light (for example, red, green and blue), and the combined light output is white light, or a time sequenced red, green and blue light. For purposes of the description provided herein, "color light" and "wavelength spectrum light" are both intended to mean light having a wavelength spectrum range which may be correlated to a specific color if visible to the human eye. The more general term "wavelength spectrum light" refers to both visible and other wavelength spectrums of light including, for example, infrared light.

According to one aspect, each input light source comprises one or more light emitting diodes (LED's). Various light sources can be used such as lasers, laser diodes, organic LED's (OLED's), and non solid state light sources such as ultra high pressure (UHP), halogen or xenon lamps with appropriate collectors or reflectors. Light sources, light collimators, lenses, and light integrators useful in the present invention are further described, for example, in Published U.S. Patent Application No. US 2008/0285129, the disclosure of which is herein included in its entirety.

In one aspect, homogenizing polarization converter module 30 includes a polarization converter 40 that is capable of converting unpolarized partially collimated combined color light output 24 into homogenized polarized light 45. Homogenizing polarization converter module 30 further can include a monolithic array of lenses 42, such as a optional monolithic FEA of lenses described elsewhere that can homogenize and improve the uniformity of the partially collimated combined color light output 24 that exits the homogenizing polarization converter module 30 as homogenized polarized light 45. Representative arrangements of optional FEA associated with the homogenizing polarization converter module 30 are described, for example, in co-pending U.S. Patent Ser. Nos. 61/346,183 entitled FLY EYE INTEGRATOR POLARIZATION CONVERTER, filed May 19, 2010); 61/346,190 entitled POLARIZED PROJECTION ILLUMINATOR, filed May 19, 2010); and 61/346,193 entitled COMPACT ILLUMINATOR, filed May 19, 2010).

In one aspect, image generator module 50 includes a polarizing beam splitter (PBS) 56, representative imaging optics 52, 54, and a spatial light modulator 58 that cooperate to convert the homogenized polarized light 45 into an imaged light 65. Suitable spatial light modulators (that is, image generators) have been described previously, for example, in U.S. Pat. No. 7,362,507 (Duncan et al.), U.S. Pat. No. 7,529,029 (Duncan et al.); in U.S. Publication No. 2008-0285129-A1 (Magarill et al.); and also in PCT Publication No. WO2007/016015 (Duncan et al.). In one particular embodiment, homogenized polarized light 45 is a divergent light originating from each lens of the optional FEA. After passing through imaging optics 52, 54 and PBS 56, homogenized polarized light 45 becomes imaging light 60 that uniformly illuminates the spatial light modulator. In one particular embodiment, each of the divergent light ray bundles from each of the lenses in the optional FEA illuminates a major portion of the spatial light modulator 58 so that the individual divergent ray bundles overlap each other.

In one aspect, projection module 70 includes representative projection optics 72, 74, 76, that can be used to project imaged light 65 as projected light 80. Suitable projection optics 72, 74, 76 have been described previously, and are well known to those of skill in the art.

Following are a list of embodiments of the present disclosure.

Item 1 is a color combiner, comprising: a light collection optics having a light input surface and an optical axis; a first and a second light source disposed to inject a first and a second color light into the light input surface, at least one of the first and second light sources displaced from the optical axis; a first face of a polarizing beam splitter (PBS) facing the light collection optics and opposite the light input surface, the PBS including a reflective polarizer disposed at a polarizer angle to the optical axis; a first dichroic plate disposed facing a second face of the PBS opposite the light collection optics, the first dichroic plate disposed at a first tilt angle to the optical axis; a second dichroic plate disposed facing a third face of the PBS, the second dichroic plate disposed at a second tilt angle to the optical axis; and a first and a second retarder disposed between the PBS and the first and second dichroic plates, respectively, wherein each of the first and second dichroic plates include a first dichroic reflector capable of reflecting the first color light and transmitting other color light and a second reflector capable of reflecting the second color light, and further wherein the first dichroic reflector and the second reflector are each tilted such that the first and the second color light beam exit the PBS in an output direction as a collimated combined color light beam.

Item 2 is the color combiner of item 1, wherein the light collection optics comprises light collimation optics.

Item 3 is the color combiner of item 2, wherein the light collimation optics comprises a one lens design, a two lens design, a diffractive optical element, or a combination thereof.

Item 4 is the color combiner of item 1 to item 3, wherein the light collection optics comprises: a first lens having a first convex surface opposite the light input surface; and a second lens having a second surface facing the first convex surface, and a third convex surface opposite the second surface.

Item 5 is the color combiner of item 1 to item 4, wherein each of the first and second color light include a first divergence angle, and the combined color light beam includes a second divergence angle that comprises an angle less than about 20 degrees.

Item 6 is the color combiner of item 1 to item 5, wherein each second reflector comprises a broadband mirror.

Item 7 is the color combiner of item 1 to item 6, wherein at least one second reflector comprises a second dichroic reflector capable of reflecting the second color light and transmitting other color light.

Item 8 is the color combiner of item 1 to item 7, further comprising a third light source disposed to inject a third color light into the light input surface and wherein the first and second dichroic plate each further comprises a third reflector capable of directing the third color light to exit in the output direction as the collimated combined color light beam.

Item 9 is the color combiner of item 8, wherein the third reflector comprises a broadband mirror.

Item 10 is the color combiner of item 8 or item 9, wherein the third reflector comprises a third dichroic reflector capable of reflecting the third color light and transmitting other color light.

Item 11 is the color combiner of item 5, wherein the second divergence angle comprises an angle less than about 15 degrees.

Item 12 is the color combiner of item 5, wherein the second divergence angle comprises an angle less than about 12 degrees.

Item 13 is a color combiner, comprising: a light collection optics having a light input surface and an optical axis; a first, a second, and a third light source disposed to inject a first, a second, and a third color light into the light input surface, at least two of the first, the second, and the third light sources displaced from the optical axis; a first face of a polarizing beam splitter (PBS) facing the light collection optics opposite the light input surface, the PBS including a reflective polarizer disposed at a polarizer angle to the optical axis; a first dichroic plate disposed facing a second face of the PBS opposite the light collection optics, the first dichroic plate disposed at a first tilt angle to the optical axis; a second dichroic plate disposed facing a third face of the PBS, the second dichroic plate disposed at a second tilt angle to the optical axis; and a first and a second retarder disposed between the PBS and the first and second dichroic plates, respectively, wherein each of the first and second dichroic plates include a first dichroic reflector capable of reflecting the first color light and transmitting other color light, a second dichroic reflector capable of reflecting the second color light and transmitting other color light, and a third reflector, and further wherein the first dichroic reflector, the second dichroic reflector, and the third reflector are each tilted such that the first, the second, and the third color light beam exit the PBS in an output direction as a collimated combined color light beam.

Item 14 is the color combiner of item 13, wherein each of the first, the second, and the third color light includes a first divergence angle, and the collimated combined color light beam includes a second divergence angle that comprises an angle less than about 20 degrees.

Item 15 is the color combiner of item 13 or item 14, wherein the third reflector is a broadband mirror.

Item 16 is the color combiner of item 13 to item 15, wherein the third reflector is a third dichroic reflector capable of reflecting the third color light and transmitting other color light.

Item 17 is the color combiner of item 14 to item 16, wherein the second divergence angle comprises an angle less than about 15 degrees.

Item 18 is the color combiner of item 14 to item 17, wherein the second divergence angle comprises an angle less than about 12 degrees.

Item 19 is an image projector, comprising: the color combiner of item 1 to item 18; a polarization converter disposed to accept the first, the second, and the third color light and output a polarized first, second, and third color light; a spatial light modulator disposed to impart an image to the polarized first, second, and third color light; and projection optics.

Item 20 is the image projector of item 19, wherein the spatial light modulator comprises a liquid crystal on silicon (LCoS) imager or a transmissive liquid crystal display (LCD).

Unless otherwise indicated, all numbers expressing feature sizes, amounts, and physical properties used in the specification and claims are to be understood as being modified by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein.

All references and publications cited herein are expressly incorporated herein by reference in their entirety into this disclosure, except to the extent they may directly contradict this disclosure. Although specific embodiments have been illustrated and described herein, it will be appreciated by those of ordinary skill in the art that a variety of alternate and/or equivalent implementations can be substituted for the specific embodiments shown and described without departing from the scope of the present disclosure. This application is intended to cover any adaptations or variations of the specific embodiments discussed herein. Therefore, it is intended that this disclosure be limited only by the claims and the equivalents thereof.

What is claimed is:

1. A color combiner, comprising:
   a light collection optics having a light input surface and an optical axis;
   a first and a second light source disposed to inject a first and a second color light into the light input surface, at least one of the first and second light sources displaced from the optical axis;
   a first face of a polarizing beam splitter (PBS) facing the light collection optics and opposite the light input surface, the PBS including a reflective polarizer disposed at a polarizer angle to the optical axis;
   a first dichroic plate disposed facing a second face of the PBS opposite the light collection optics, the first dichroic plate disposed at a first tilt angle to the optical axis;
   a second dichroic plate disposed facing a third face of the PBS, the second dichroic plate disposed at a second tilt angle to the optical axis; and
   a first and a second retarder disposed between the PBS and the first and second dichroic plates, respectively,
   wherein each of the first and second dichroic plates include a first dichroic reflector capable of reflecting the first color light and transmitting other color light and a second reflector capable of reflecting the second color light, and further
   wherein the first dichroic reflector and the second reflector are each tilted such that the first and the second color light beam exit the PBS in an output direction as a collimated combined color light beam.

2. The color combiner of claim 1, wherein the light collection optics comprises light collimation optics.

3. The color combiner of claim 2, wherein the light collimation optics comprises a one lens design, a two lens design, a diffractive optical element, or a combination thereof.

4. The color combiner of claim 1, wherein the light collection optics comprises:
   a first lens having a first convex surface opposite the light input surface; and
   a second lens having a second surface facing the first convex surface, and a third convex surface opposite the second surface.

5. The color combiner of claim 1, wherein each of the first and second color light include a first divergence angle, and the collimated combined color light beam includes a second divergence angle that comprises an angle less than about 20 degrees.

6. The color combiner of claim 1, wherein each second reflector comprises a broadband mirror.

7. The color combiner of claim 1, wherein at least one second reflector comprises a second dichroic reflector capable of reflecting the second color light and transmitting other color light.

8. The color combiner of claim 1, further comprising a third light source disposed to inject a third color light into the light input surface and wherein the first and second dichroic plate each further comprises a third reflector capable of directing the third color light to exit in the output direction as the combined color light beam.

9. The color combiner of claim 8, wherein the third reflector comprises a broadband mirror.

10. The color combiner of claim 8, wherein the third reflector comprises a third dichroic reflector capable of reflecting the third color light and transmitting other color light.

11. The color combiner of claim 5, wherein the second divergence angle comprises an angle less than about 15 degrees.

12. The color combiner of claim 5, wherein the second divergence angle comprises an angle less than about 12 degrees.

13. A color combiner, comprising:
   a light collection optics having a light input surface and an optical axis;
   a first, a second, and a third light source disposed to inject a first, a second, and a third color light into the light input surface, at least two of the first, the second, and the third light sources displaced from the optical axis;
   a first face of a polarizing beam splitter (PBS) facing the light collection optics opposite the light input surface, the PBS including a reflective polarizer disposed at a polarizer angle to the optical axis;
   a first dichroic plate disposed facing a second face of the PBS opposite the light collection optics, the first dichroic plate disposed at a first tilt angle to the optical axis;
   a second dichroic plate disposed facing a third face of the PBS, the second dichroic plate disposed at a second tilt angle to the optical axis; and
   a first and a second retarder disposed between the PBS and the first and second dichroic plates, respectively,
   wherein each of the first and second dichroic plates include a first dichroic reflector capable of reflecting the first color light and transmitting other color light, a second dichroic reflector capable of reflecting the second color light and transmitting other color light, and a third reflector, and further
   wherein the first dichroic reflector, the second dichroic reflector, and the third reflector are each tilted such that the first, the second, and the third color light beam exit the PBS in an output direction as a collimated combined color light beam.

14. The color combiner of claim 13, wherein each of the first, the second, and the third color light includes a first divergence angle, and the collimated combined color light beam includes a second divergence angle that comprises an angle less than about 20 degrees.

15. The color combiner of claim 13, wherein the third reflector is a broadband mirror.

16. The color combiner of claim 13, wherein the third reflector is a third dichroic reflector capable of reflecting the third color light and transmitting other color light.

17. The color combiner of claim 14, wherein the second divergence angle comprises an angle less than about 15 degrees.

18. The color combiner of claim 14, wherein the second divergence angle comprises an angle less than about 12 degrees.

19. An image projector, comprising:
   the color combiner of claim 8 or claim 13;
   a polarization converter disposed to accept the first, the second, and the third color light and output a polarized first, second, and third color light;
   a spatial light modulator disposed to impart an image to the polarized first, second, and third color light; and
   projection optics.

20. The image projector of claim 19, wherein the spatial light modulator comprises a liquid crystal on silicon (LCoS) imager or a transmissive liquid crystal display (LCD).

\* \* \* \* \*